(12) United States Patent
Hoashi

(10) Patent No.: US 11,209,527 B2
(45) Date of Patent: Dec. 28, 2021

(54) OPTICAL SCANNING DEVICE

(71) Applicant: DENSO CORPORATION, Kariya (JP)

(72) Inventor: Yoshiaki Hoashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 650 days.

(21) Appl. No.: 16/069,720

(22) PCT Filed: Nov. 28, 2016

(86) PCT No.: PCT/JP2016/085180
§ 371 (c)(1),
(2) Date: Jul. 12, 2018

(87) PCT Pub. No.: WO2017/122440
PCT Pub. Date: Jul. 20, 2017

(65) Prior Publication Data
US 2019/0025410 A1    Jan. 24, 2019

(30) Foreign Application Priority Data

Jan. 14, 2016  (JP) .............................. JP2016-005235

(51) Int. Cl.
| | | |
|---|---|---|
| *G01C 3/08* | (2006.01) | |
| *G01S 7/481* | (2006.01) | |
| *G02B 26/10* | (2006.01) | |
| *G01S 7/497* | (2006.01) | |
| *G01S 17/42* | (2006.01) | |
| *G01S 17/10* | (2020.01) | |
| *G02B 26/08* | (2006.01) | |

(52) U.S. Cl.
CPC ............ *G01S 7/4817* (2013.01); *G01S 7/481* (2013.01); *G01S 7/4972* (2013.01); *G01S 17/10* (2013.01); *G01S 17/42* (2013.01); *G02B 26/10* (2013.01); *G02B 26/105* (2013.01); *G02B 26/0833* (2013.01)

(58) Field of Classification Search
CPC ........ G01S 17/42; G01S 17/10; G01S 7/4817; G01S 7/481; G01S 7/4972; G02B 26/10; G02B 26/105; G02B 26/0833
USPC ......................................................... 356/4.01
See application file for complete search history.

(56) References Cited

U.S. PATENT DOCUMENTS

| | | | |
|---|---|---|---|
| 5,760,886 A * | 6/1998 | Miyazaki .............. | G01S 17/931 356/5.01 |
| 6,188,078 B1 * | 2/2001 | Bell, Jr. ................. | G02B 7/003 250/216 |
| 10,018,502 B2 * | 7/2018 | Mushimoto .............. | G01J 1/44 |

(Continued)

FOREIGN PATENT DOCUMENTS

| | | |
|---|---|---|
| JP | 2002-090681 A | 3/2002 |
| JP | 2004-144926 A | 5/2004 |
| JP | 2010-266506 A | 11/2010 |

(Continued)

*Primary Examiner* — Mark Hellner
(74) *Attorney, Agent, or Firm* — Maschoff Brennan

(57) ABSTRACT

An optical scanning device is provided in a pulse distance measurement radar apparatus. The optical scanning device includes reflectors that are arranged right outside a scanning angle of an optical beam, an optical detector that is arranged at a position where reflected light from the reflectors reaches, and a scanning angle detector that detects the scanning angle of the optical beam based on result of detection by the optical detector.

13 Claims, 7 Drawing Sheets

(56) References Cited

U.S. PATENT DOCUMENTS

2009/0103156 A1* 4/2009 Lim ................. H04N 1/047
  359/201.1

FOREIGN PATENT DOCUMENTS

| JP | 2011-242725 A | 12/2011 |
| JP | 2013-210316 A | 10/2013 |

* cited by examiner

FIG.7

| LEFT | | RIGHT | | DETERMINATION | | CONTROL |
|---|---|---|---|---|---|---|
| −28° | −28+0.07° | +28+0.07° | +28° | | | |
| × | × | × | × | LEFT IS UNDERSIZED | RIGHT IS UNDERSIZED | INCREASE AMPLITUDE (0.1 DEGREE) |
| × | × | × | ○ | LEFT IS UNDERSIZED | RIGHT IS PROPER | INCREASE AMPLITUDE (0.05 DEGREES) & SHIFT TO LEFT (0.05 DEGREES) |
| × | × | ○ | ○ | LEFT IS UNDERSIZED | RIGHT IS OVERSIZED | SHIFT TO LEFT (0.05 DEGREES) |
| ○ | × | × | × | LEFT IS PROPER | RIGHT IS UNDERSIZED | SHIFT TO RIGHT (0.05 DEGREES) |
| ○ | × | × | ○ | LEFT IS PROPER | RIGHT IS PROPER | — |
| ○ | × | ○ | ○ | LEFT IS PROPER | RIGHT IS OVERSIZED | DECREASE AMPLITUDE (0.05 DEGREES) & SHIFT TO LEFT (0.05 DEGREES) |
| ○ | ○ | × | × | LEFT IS OVERSIZED | RIGHT IS UNDERSIZED | SHIFT TO RIGHT (0.05 DEGREES) |
| ○ | ○ | × | ○ | LEFT IS OVERSIZED | RIGHT IS PROPER | DECREASE AMPLITUDE (0.05 DEGREES) & SHIFT TO RIGHT (0.05 DEGREES) |
| ○ | ○ | ○ | ○ | LEFT IS OVERSIZED | RIGHT IS OVERSIZED | DECREASE AMPLITUDE (0.1 DEGREE) |

○ : WITH REFLECTION
× : WITHOUT REFLECTION

OPTICAL SCANNING DEVICE

CROSS REFERENCE RELATED APPLICATION

This patent application is based on Japanese Patent Application No. 2016-5235 filed on Jan. 14, 2016, in the Japan Patent Office, the entire disclosure of which is hereby incorporated by reference herein.

TECHNICAL FIELDS

The present disclosure relates to an optical scanning device that has a scanning angle detection function to detect a scanning angle of an optical beam.

BACKGROUND ART

To detect a scanning angle, an optical detector formed from a photodiode or the like is arranged at one end or both ends of a scanning area of an optical beam to detect the scanning optical beam using the optical detector.

CITATION LIST

Patent Literature

[PTL 1] JP 2011-242725 A

SUMMARY OF THE INVENTION

An optical detector, for example, a photodiode has at least a distance of several mm from an end portion of the optical detector to act as an effective detection unit. Accordingly, in the case of scanning with an optical beam, the optical beam needs to reach the effective detector of the optical detector, and thus a scanning area of the optical beam is wider than a necessary effective scanning area as a function of the device. For example, when the distance from the optical scanning unit to the optical detector is 20 mm and the distance from the end portion of the optical detector to the effective detector is 2 mm, a scanning optical beam needs to about 5.7 degrees wider in order to facilitate for the 2 mm distance. In the configuration in which an optical detector is arranged on both ends of the scanning area of the optical beam, the optical beam needs to be as much as approximately 11 degrees wider.

In the case of using a swing mirror formed from a Micro Electro Mechanical System (MEMS) as the optical scanning unit, for example, there is a limitation on the maximum scanning angle. Accordingly, there is a demand to reduce as much as possible the angular width of 11 degrees which is used for the optical detector. In addition, in the case of providing a fine position adjustment mechanism for the optical detector to finely adjust the detection position of the optical detector, since wires and the like are used as leads from the optical detector, configuration of the position adjustment mechanism becoming complex was an issue.

SUMMARY

An object of the present disclosure is to provide an optical scanning device in which a scanning angle of an optical beam may be minimized and a simplified configuration of a mechanism for finely adjusting a detection position of the scanning angle may be achieved.

A first mode of the present disclosure is an optical scanning device provided in a pulse distance measurement radar apparatus. The optical scanning device includes a reflector that is arranged immediately outside of a scanning angle of the optical beam, an optical detector that is arranged at a position such that reflected light from the reflector reaches the optical detector, and a scanning angle detector that detects the scanning angle of the optical beam based on the detected results of the optical detector.

BRIEF DESCRIPTION OF THE DRAWINGS

The foregoing and other objects, features, and advantages of the present disclosure will be more clarified by the following detailed description with reference to the attached drawings:

FIG. 7 is a table showing a contents of a correction control of a scanning angle;

DESCRIPTION OF EMBODIMENTS

First Embodiment

Figure 1:
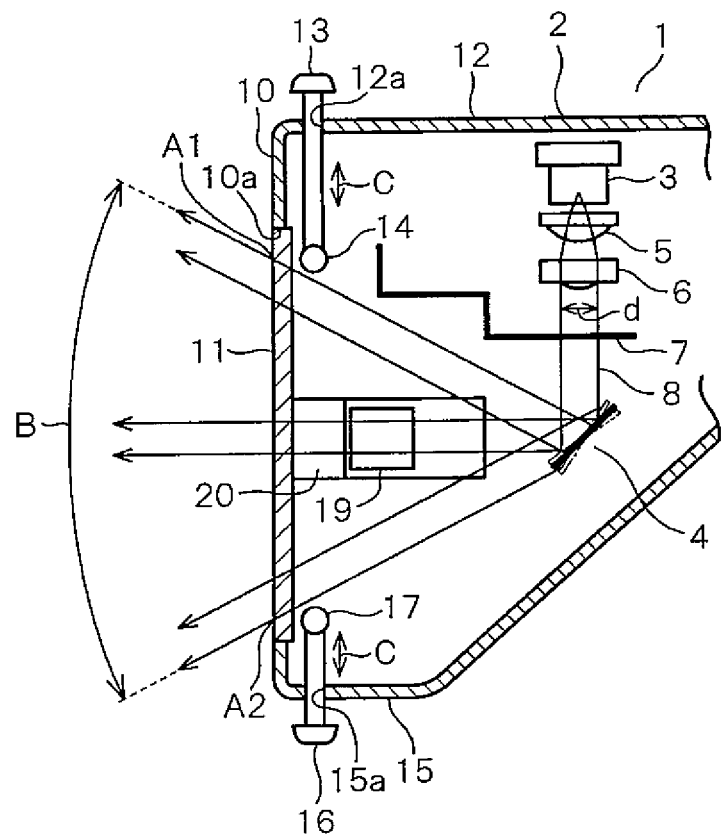
FIG. 1 is a lateral cross-sectional view of an optical scanning device in a first embodiment.
Figure 2:
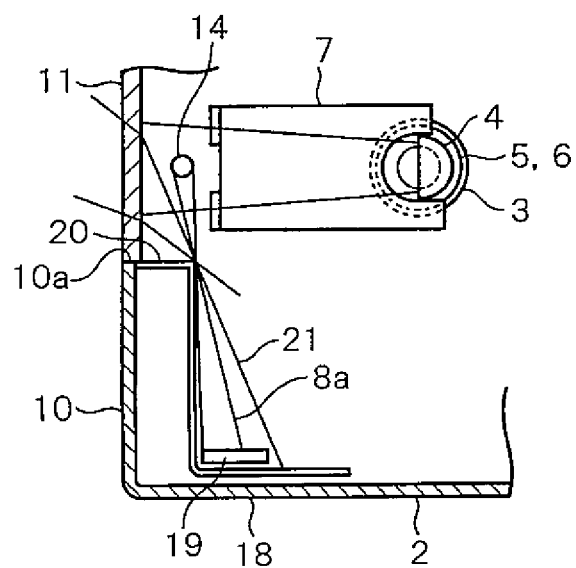
FIG. 2 is a vertical cross-sectional view of the optical scanning device.

A pulse distance measurement optical radar apparatus adopted in a first embodiment will be described with reference to FIGS. 1 to 5, hereinafter. First, FIGS. 1 and 2 are a respective lateral cross-sectional view and a vertical cross-sectional view showing an overall schematic configuration of an optical scanning device 1 of the pulse distance measurement optical radar apparatus according to the first embodiment. Other components of the pulse distance measurement optical radar apparatus (for example, a light-receiving device and the like) are not illustrated in the drawings.

A case 2 of the optical scanning device 1 contains a light source 3 that radiates a pulse-like optical beam, and an optical scanning unit 4 that performs scanning by reflection of the optical beam from the light source 3. The light source 3 includes a light-emitting diode, a laser diode, or the like, for example. The pulse-like optical beam which is emitted from the light source 3, passes through lenses 5 and 6 and a slit 7, forming a substantially square prism-shaped optical beam 8 which has a beam width d. The pulse like optical beam is emitted/irradiated to the optical scanning unit 4. The beam width d is set to about 2.1 mm, for example.

The optical scanning unit 4 is configured of a swing mirror formed from a MEMS, for example. The optical scanning unit 4 is configured to reflect the optical beam 8 emitted from the light source 3, and a scan a range from a position A1 to a position A2, using the optical beam 8. A control unit 9 that controls the optical scanning unit 4 variably controls the scanning area, that is, a scanning angle B of the optical beam 8. The control unit 9 is described later.

In the first embodiment, the distance between the position A1 and the position A2 is set to about 20 mm, for example. In order to perform scanning with the pulse-like optical beam 8, the optical scanning unit 4 is configured to perform scanning using the pulse-like optical beam 8, at a scanning displacement Δd, by shifting towards a direction to become closer to the position A1 (or the position A2) only. In the first embodiment, the scanning displacement Δd is set to about 0.23 degrees when represented as an angle, for example.

A rectangular opening member 10a is formed on a portion of a side wall 10 of a front side of the case 2 which corresponds to the scanning range of the optical beam 8. A cover glass 11 is attached to the opening portion 10a to close the opening portion 10a. The cover glass 11 has a function of transmitting the optical beam 8. In the first embodiment, a distance between an inner surface of the cover glass 11 and the optical scanning unit 4 is set to about 20 mm, for example.

A screw hole 12a is formed on a portion of a side wall 12 next to the/a side wall 10. The side wall 12 is provided on a side of the A1 position of the case 2. A first screw 13 is threaded into the screw hole 12a. For example, a spherical reflector 14 for reflecting the optical beam 8 is provided at a leading end portion of the first screw 13. In this case, the first screw 13 is turned and fastened in either a right or a left direction to allow a position of the reflector 14 to reciprocate by a minute distance in a direction of the arrow C. The first screw 13 and the screw hole 12a which is provided on the side wall 1 to configure an adjustment mechanism for adjusting the position of the reflector 14.

A screw hole 15a is formed on a portion of a side wall 15 next to the side wall 10. The side wall 15 is provided on a side of the position A2 of the case 2. A second screw 16 is inserted into the screw hole 15a. For example, a spherical reflector 17 for reflecting the optical beam 8 is attached to a leading end of the second screw 16. In this case, the second screw 16 is turned and fastened in either a right or left direction to allow the position of the reflector 17 to reciprocate by a minute distance in the direction of arrow C. The second screw 16, and the screw hole 15a which is provided on the side wall 15 configure an adjustment mechanism for adjusting the position of the reflector 17.

As illustrated in FIG. 2, an optical detector 19 is arranged in a position on an upper surface of a bottom wall 18 of the case 2, in proximity to the side wall 10. The position of the optical detector 19 corresponds to the midpoint between the two reflectors 14 and 17. The optical detector 19 is formed from a photo diode, for example, that receives a reflected light 8a of the optical beam 8 from the reflectors 14 and 17.

A shielding body 20 is formed as a shield structure which protrudes inwards towards a vicinity of the optical detector 19, for example. The shield body is provided on an upper section of the optical detector 19, on an inner surface of the side wall 10. The shield body 20 has a blocking function, such that, an optical beam 8 which passes through the cover glass 11 and is emitted externally hits a distance measurement target object or the like. At this point, when a reflected light 21 which is reflected from the object or the like passes through the cover glass 11 and enters inside, the shielding body 20 shields the optical detector 19 from the reflected light 21, in order to prevent the optical detector 19 from receiving the reflected light 2l, as shown in FIG. 2. In this configuration, the shielding body 20 is arranged to block a light path which connects the cover glass 11 and the optical detector 19 in a straight line manner, so that the optical detector 19 is shielded from at least the scattered light from the cover glass 11. A light-receiving device receives the reflected light reflected from the object or the like. The light receiving device is omitted from the diagram of pulse distance measurement radar apparatus.

Figure 3:
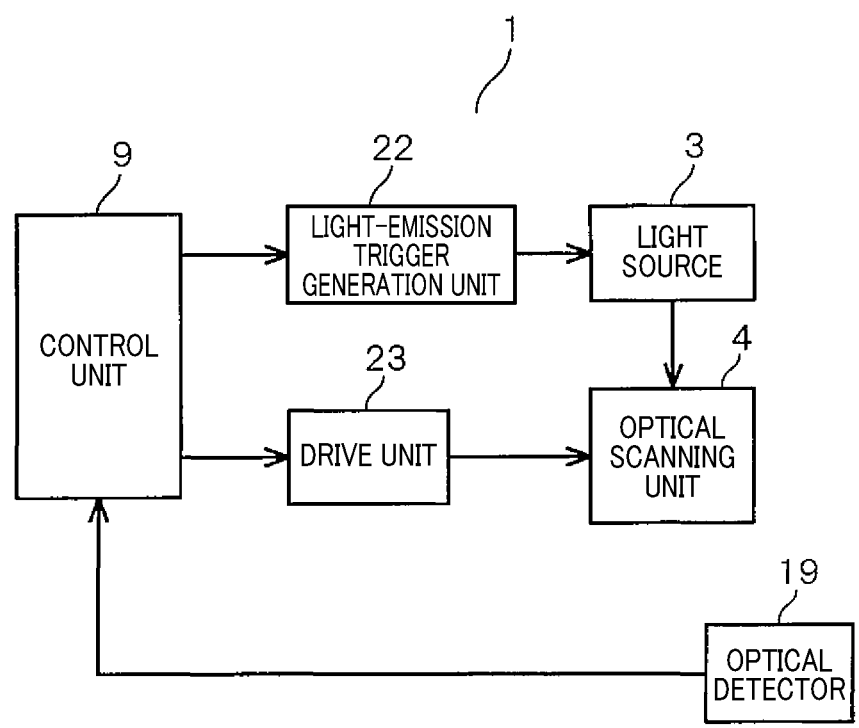
FIG. 3 is a functional block diagram of the optical scanning device.

FIG. 3 is a block diagram illustrating an electrical configuration of the optical scanning device 1 described above. As illustrated in FIG. 3, the optical scanning device 1 includes the control unit 9, a light-emission trigger generation unit 22, the light source 3, a drive unit 23, the optical scanning unit 4, and the optical detector 19.

The control unit 9 has functions of controlling on/off states of the light source 3, controlling on/off states of the optical scanning unit 4 and also the scanning angle (that is, the scanning area) of the optical scanning unit 4, and also a function of receiving a detection signal from the optical detector 19 and detecting the scanning angle. The control unit 9 functions as a scanning angle detector. The control unit 9 transmits to the light-emission trigger generation unit 22 a control signal to switch the light source 3 on and off, and also transmits to the drive unit 23 a controlling signal to switch the optical scanning unit 4 on and off, and a control signal for setting a scanning angle of the optical scanning unit 4.

Upon receipt of the control signal for switching on the light source 3 from the control unit 9, the light-emission trigger generation unit 22 generates a pulse-like light-emission trigger signal with a preset cycle and transmits the same to the light source 3. Upon receipt of the control signal for switching off the light source 3 from the control unit 9, the light-emission trigger generation unit 22 stops the generation and transmission of the light-emission trigger signal. Upon receipt of the light-emission trigger signal from the light-emission trigger generation unit 22, the light source 3 outputs the pulse-like optical beam 8.

Upon receipt of the control signal for switching on, via the drive unit 23, and the control signal for setting a scanning angle from the control unit 9, the optical scanning unit 4 starts scanning with the optical beam 8 and continues the scanning with the optical beam 8 at the set scanning angle.

In the optical scanning device 1 of the first embodiment, when scanning is performed with the pulse-like optical beam 8, the optical scanning unit 4 emits the pulse-like 8 with the scanning displacement Δd, for example, by shifting at about 0.23 degrees. The scanning displacement Δd can also be set to an arbitrary angle other than 0.23 degrees. In the optical scanning device 1 of the first embodiment, the position of scanning with the optical beam 8 can be finely adjusted by units of 0.025 degrees, 0.05 degrees, or 0.07 degrees. Alternatively, the position of scanning with the optical beam 8 may be finely adjusted by an arbitrary angle smaller than 0.025 degrees, an arbitrary angle between 0.025 to 0.05 degrees in angle, or an arbitrary angle larger than 0.07 degrees.

Figure 4:
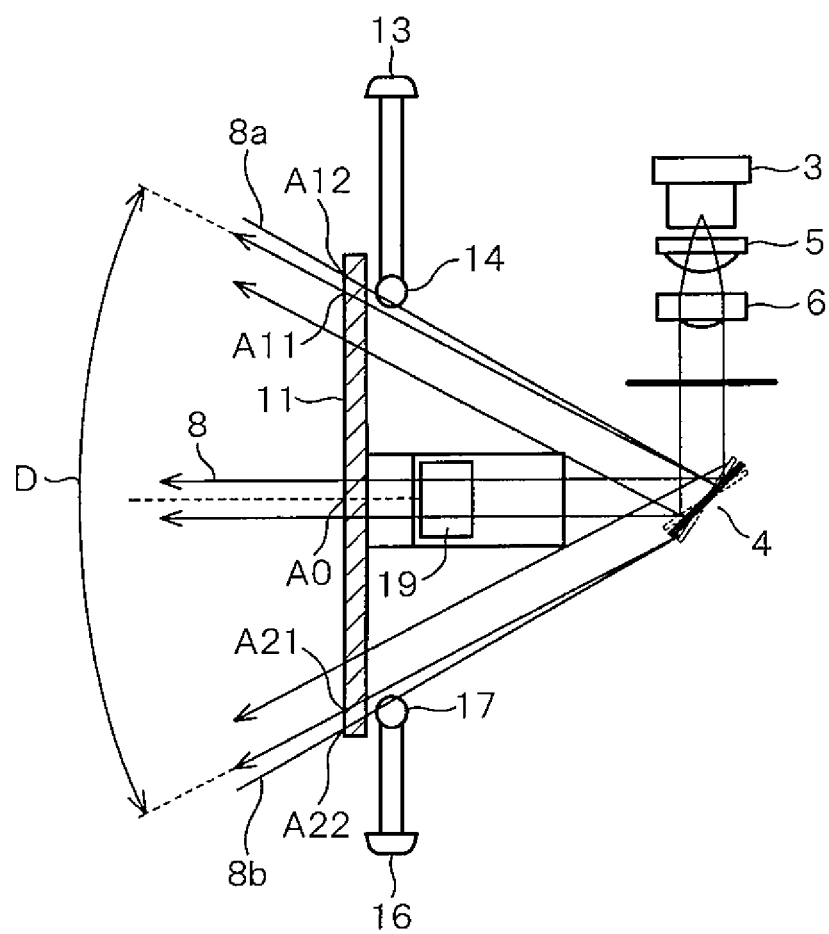
FIG. 4 is a diagram describing a scanning angle detection operation.

Next, operations in the foregoing configuration will be described with reference to FIGS. 4 and 5. In the first embodiment, the scanning angle D of the optical beam 8 necessary for the original distance measurement function is set to 55 degrees, for example. FIG. 4 illustrates the distance measurement scanning angle D, for example, of 55 degrees. Referring to FIG. 4, the optical beam 8 is illustrated at a position A0 in the middle of the distance measurement scanning angle, and the position A0 is set as a position of 0 degrees. In addition, the optical beam 8 is illustrated at a position A11 at one end (for example, the right end) of the distance measurement scanning angle D, and the position A11 is set as a position of +27.5 degrees. Further, the optical beam 8 is illustrated at a position A21 at another end (for example, left end) of the distance measurement scanning angle D, and the position A21 is set as a position of 27.5 degrees.

Next, in the first embodiment, after scanning of the one end of the distance measurement scanning angle D at the position A11 is performed with the optical beam 8, one of the optical beams 8a for the scanning angle detection is provided on an outside thereof, at a position A12 of +28 degrees, for example (that is, the position where 0.5 degrees is added to +27.5 degrees). Similarly, after scanning at the other end of the distance measurement scanning angle at the position A21 is performed with the optical beam 8, another optical beam 8b for scanning angle detection is provided on an outside thereof, at a position 422 of −28 degrees, for example (that is, the position where 0.5 degrees is subtracted from −27.5 degrees).

In the embodiment, the first screw 13 is turned to adjust the position of the reflector 14 such that the optical beam 8a at the position A12 of +28 degrees controlled in scanning angle by the control unit 9 hits and reflects from the reflector 14 and the optical beam at a position (+28 degrees−0.07 degrees) controlled in scanning angle by the control unit 9 that does not hit the reflector 14, that is, does not reflect onto the reflector 14.

In the first embodiment, the first screw 13 is turned to adjust the position of the reflector 14 such that the optical beam 8a at the position of +28 degrees of the position A12 is controlled in the scanning angle by the control unit 9. The position of the reflector 14 is also adjusted so that that optical beam which is controlled by the scanning angle, at a position of (+28 degrees−0.07 degrees) will not hit, that is reflect on the reflector 14. Similarly, the second screw 16 is turned to adjust the position of the reflector 17 such that the other optical beam 8b at the position A22 of −28 degrees is controlled in scanning angle by the control unit 9 to hit and reflect on the reflector 14. The position of the reflector 17 is also adjusted such that the optical beam at a position (−28 degrees+0.07 degrees) which is controlled in scanning angle by the control unit 9, will not hit the reflector 14, that is, will not reflect onto the reflector 14.

Figure 5:
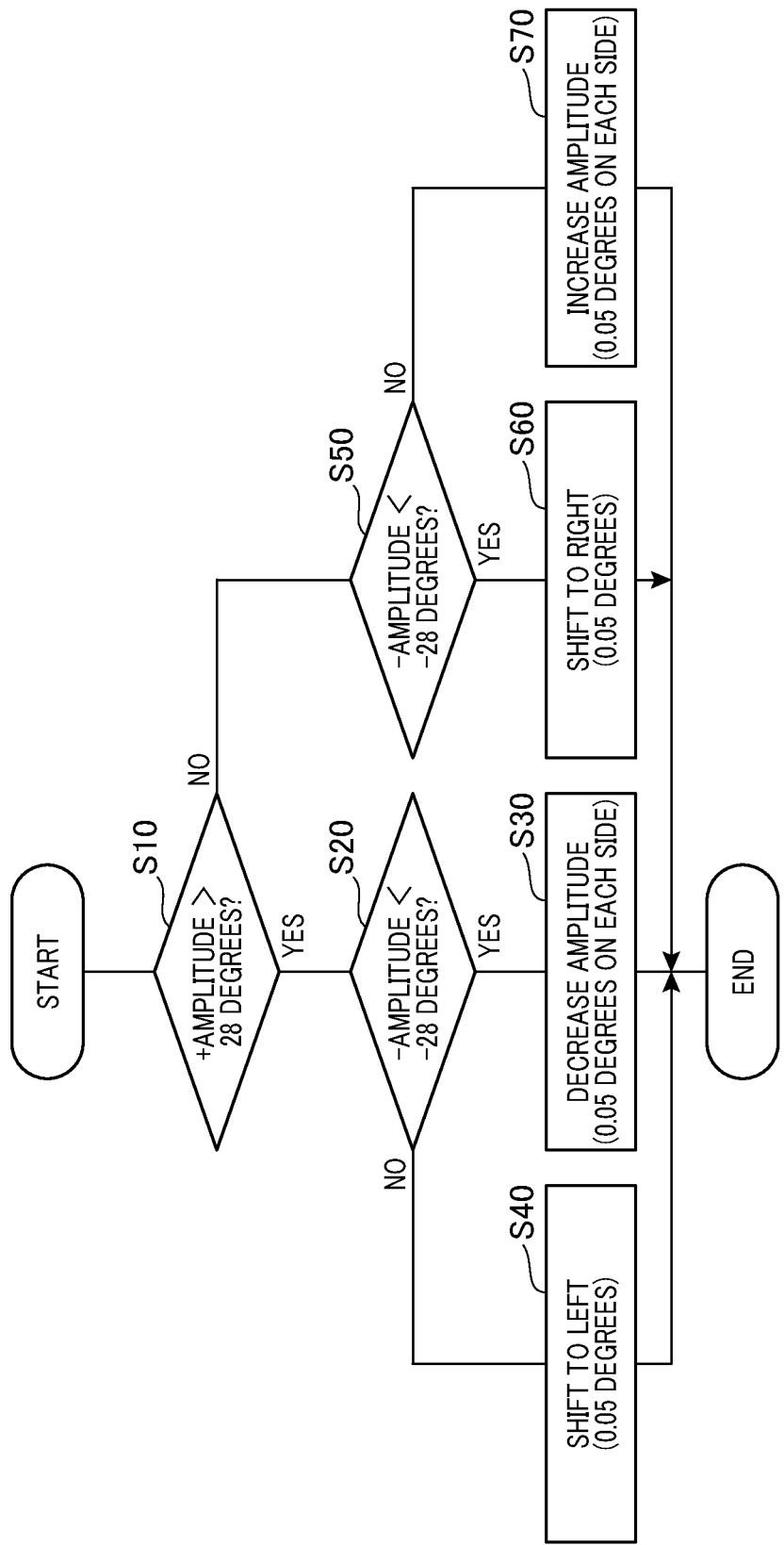
FIG. 5 is a flowchart of a correction control of a scanning angle.

Each time the area from the position A12 to the position A22 (or the position A22 to the position A12) is scanned with the optical beam 8, the control for correction of the scanning angle which is described in the flowchart of FIG. 5 is executed. The flowchart of FIG. 5 describes the contents of the control for the correction of the scanning angle performed by the control unit 9.

In step S10 of FIG. 5, the control unit 9 determines whether the amplitude of the scanning angle on the very end of a positive side is larger than 28 degrees, that is, whether the optical detector 19 has detected reflected light of the optical beam 8 from the reflector 14 at the position A12 of +28 degrees. When the amplitude on the very end of the positive side is larger than 28 degrees, the control unit 9 moves to step S20 to determine whether the amplitude on the very end of the negative side is smaller than −28 degrees. That is, at step S20 it is determined whether the optical detector 19 has detected reflected light of the optical beam 8 from the reflector 17 at the position A22 of −28 degrees. When the amplitude on the very end of the negative side is smaller than −28 degrees, the control unit 9 moves to step S30 to decrease the amplitude of the distance measurement scanning angle D by 0.05 degrees on each side thereof side. That is, the distance measurement scanning angle is corrected such that 0.05 degrees, for example, is subtracted from the position A11 of the optical beam 8 at one end of the distance measurement scanning angle (that is, 0.05 degrees subtracted from +27.5 degrees). Additionally, 0.05 degrees, for example, is added to the position A21 (that is, 0.05 degrees added to −27.5 degrees) of the optical beam 8 at another end thereof. Then, the control unit 9 ends the control described in FIG. 5.

When determining in step S20 that the amplitude is larger than −28 degrees, on the very end of the negative side, the control unit 9 moves to step S40 to shift the scanning angle D to the left by 0.05 degrees. That is, the distance measurement scanning angle is corrected such that 0.05 degrees, for example, is subtracted from the position A21 (that is, −27.5 degrees) of the optical beam 8 at the other end of the distance measurement scanning angle D, also 0.05 degrees, for example, is subtracted from the position A11 (that is, +27.5 degrees) of the optical beam 8 at one end. Then, the control unit 9 ends the control described in FIG. 5.

When determining in step S10 that the amplitude is smaller than 28 degrees on the very end of the positive side, the control unit 9 moves to step S50 to determine whether the amplitude is smaller than −28 degrees on the very end of the positive side. That is, in step S10 it is determined whether the optical detector 19 has detected reflected light of the optical beam 8 from the reflector 17 at the position A22 of −28 degrees. When the amplitude on the very end of the negative side is smaller than −28 degrees, the control unit 9 moves to step S60 to shift the scanning angle D to the right by 0.05 degrees. That is, the distance measurement scanning angle is corrected such that 0.05 degrees, for example, is added to the position A11 (that is, +27.5 degrees) of the optical beam 8 at one end of the distance measurement scanning angle, and 0.05 degrees, for example, is added to the position A21 (that is, −27.5 degrees) of the optical beam 8 at the other end. Then, the control unit 9 ends the control described in FIG. 5.

In step S50, when it is determined that the amplitude is larger than −28 degrees on the very end of the negative side, the control unit 9 moves to step S70 to increase the amplitude by 0.05 degrees on each side thereof. That is, the distance measurement scanning angle is corrected by adding 0.05 degrees, for example, to the position A11 (that is, +27.5 degrees) of the optical beam 8 at the one end of the distance measurement scanning angle, and also by subtraction of 0.05 degrees, for example, from the position A21 that is, −27.5 degrees) of the optical beam 8 at the other end. Then, the control unit 9 ends the control described in FIG. 5.

The control for the correction of scanning angle described in the flowchart of FIG. 5 is repeatedly executed to hold the position of the optical beam 8 at the one end of the distance measurement scanning angle D at the position (+27.5 degrees±0.05 degrees), and also to hold the position of the optical beam 8 at the other end of the distance measurement scanning angle at the position (−27.5 degrees±0.05 degrees). In other words, the position of the optical beam 8 for scanning angle detection is held at the position (±28 degrees±0.05 degrees) or the position (−28 degrees±0.05 degrees).

According to the configured embodiment, when the scanning angle D of the optical beam 8 necessary for the original distance measurement function is 55 degrees, for example, the scanning angle of the optical beam 8 for scanning angle detection can be set to 56 degrees, for example, which means that the scanning angle of the optical beam can be minimized. In the embodiment, the first screw 13, the screw hole 12a, the second screw 16, and the screw hole 15a are provided as an adjustment mechanism for finely adjusting the positions of the reflectors 14 and 17 for the scanning angle detection, thereby making it possible to simplify the configuration of the adjustment mechanism for fine adjustment.

In the embodiment, the respective one and other optical beams 8a and 8b for scanning angle detection are provided at the positions A12 and A22 of ±28 degrees. The one and other optical beams 8a and 8b are separated from the positions A11 and A21 at 0.5 degrees at the one and other end of optical beam 8 of the distance measurement scanning angle D. This makes it possible to reliably prevent the occurrence of the optical beam 8 hitting the reflectors 14 and 17 at the distance measurement scanning angle of 55 degrees.

In the foregoing embodiment, only the one optical detector 19 is provided as an optical sensor for scanning angle detection when the positions of the both ends of the scanning angle D are detected. This achieves reduction of the number of parts and manufacturing cost.

In the foregoing embodiment, the one and other optical beams 8a and 8b for scanning angle detection are provided at the positions A12 and A22 of ±28 degrees. Alternatively, the one and other optical beams 8, may be provided at positions which are closer to ±27.5 degrees than ±28 degrees. In this case, the one and other optical beams 8 for scanning angle detection are preferably provided at the positions closest to ±27.5 degrees where 0.07 degrees, for example, is added to or subtracted from ±27.5 degrees. When the one and other optical beams 8 and 8 for scanning angle detection are provided at positions which have a further distance from +27.5 degrees than +28 degrees, their positions may be determined in an appropriate manner.

Second Embodiment

Figure 6:
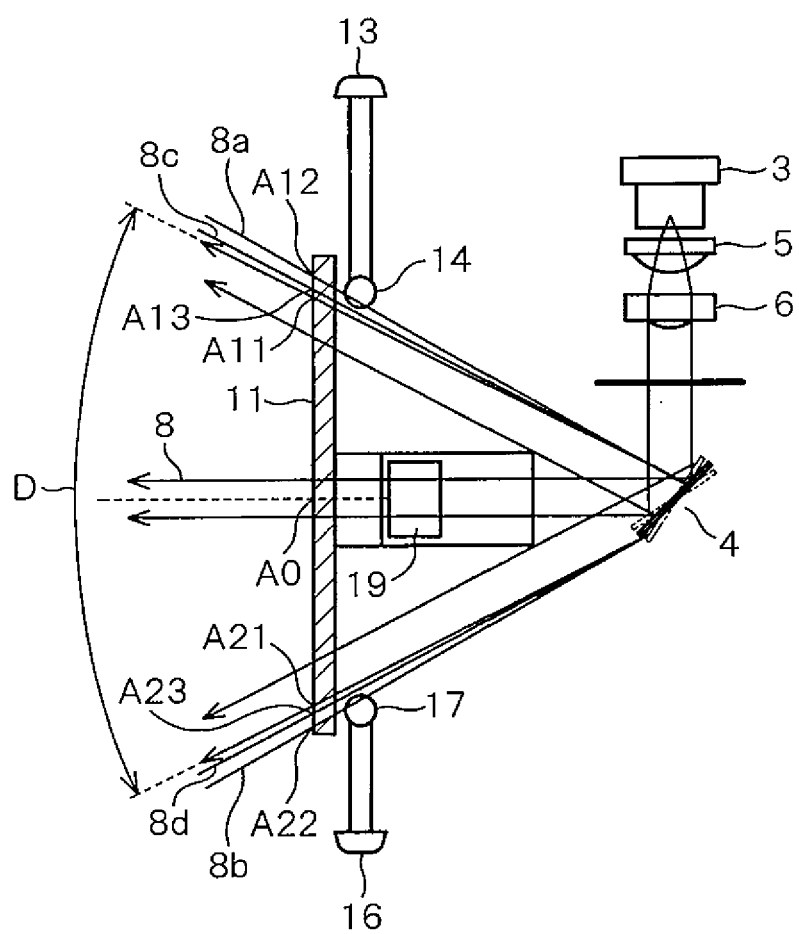
FIG. 6 is a diagram describing a detecting operation of a scanning angle according to a second embodiment.

FIGS. 6 and 7 illustrate a second embodiment. Components of the second embodiment which are the same as those of the first embodiment are given the same reference signs. In the second embodiment, as illustrated in FIG. 6, the one optical beam 8a for scanning angle detection is provided at the position A12 of +28 degrees, and one additional optical beam 8c for scanning angle detection is provided inside the position A12, for example, at a position which is 0.07 degrees inside thereof, that is, a position A13 of +27.93 degrees. In this case, the optical beam 8a corresponds to a first detection optical beam, and the additional optical beam 8c corresponds to a second detection optical beam.

Similarly, the other optical beam 8b for scanning angle detection is provided at the position A22 of −28 degrees, and the other additional optical beam 8d for scanning angle detection is provided inside the position A22, for example, at a position which is 0.07 degrees inside thereof, that is, at a position A23 of −27.93 degrees. In this case, the optical beam 8b corresponds to the first detection optical beam, and the additional optical beam 8d corresponds to the second detection optical beam.

Then, the distance measurement scanning angle D (that is, the detection scanning angle) is subjected to a correction control as shown in FIG. 7 depending on whether the foregoing four optical beams 8a, 8b, 8c, and 8d, that is, the optical beams 8a, 8b, 8c, and 8d at the respective positions A12, A13, A22, and A23 either hit the reflectors 14 and 17 and are detected by the optical detector 19 or do not hit the reflectors 14 and 17 and are not detected by the optical detector 19. The correction control shown in FIG. 7 is executed each time scanning is performed with the optical beam 8 from the position A12 to the position A22 (or from the position A22 to the position A12). Referring to FIG. 7, the symbol "a" represents the presence of detection of reflected light and the symbol "×" represents the absence of detection of reflected light. The correction control of a scanning angle will be described below.

First, when no reflected light of the four optical beams 8 is detected as shown in the first row of the table in FIG. 7, it is determined that both a right side (one side) and a left side (the other side) are small, that is, undersized, and the amplitude of the distance measurement scanning angle D is increased by 0.1 degree, for example. In this case, the position A11 (+27.5 degrees) of the optical beam 8 at the one end (that is, right) of the distance measurement scanning angle D is increased by 0.05 degrees, and the position A21 (−27.5 degrees) of the optical beam 8 at the other end (that is, left) is decreased by 0.05 degrees.

When only the reflected light of the optical beam 8 at the position of +28 degrees among the four optical beams 8 is detected as shown on the second row of the table in FIG. 7, it is determined that the right side is an optimum size and the left side is undersized. In this case, the distance measurement scanning angle D is increased in amplitude by 0.05 degrees and is shifted to the left by 0.05 degrees. Specifically, the position A11 (+27.5 degrees) of the optical beam 8 at the one end (that is, right) of the distance measurement scanning angle is decreased by 0.025 degrees, and the position A21 (−27.5 degrees) of the optical beam 8 at the other end (that is, left) is decreased by 0.75 degrees.

When the reflected light of the optical beam 8 at the position of +28 degrees and the optical beam 8 at the position of (+28−0.07) degrees among the four optical beams 8 is detected as shown on the third row of the table in FIG. 7, it is determined that the right side is large, that is, oversized, and the left side is undersized. In this case, the distance measurement scanning angle D is shifted to the left by 0.05 degrees. Specifically, the position A11 (+27.5 degrees) of the optical beam 8 at the one end (that is, right) of the distance measurement scanning angle D is decreased by 0.05 degrees, and the position A2 (−27.5 degrees) of the optical beam 8 at the other end (that is, left) is decreased by 0.05 degrees.

When only the reflected light of the optical beam 8 at the position of −28 degrees among the four optical beams 8 is detected as shown in the fourth row of the table in FIG. 7, it is determined that the right side is undersized and the left side is an optimum size. In this case, the distance measurement scanning angle D is shifted to the right by 0.05 degrees. Specifically, the position A11 (+27.5 degrees) of the optical beam 8 at the one end (that is, right) of the distance measurement scanning angle D is increased by 0.05 degrees, and the position A21 (−27.5 degrees) of the optical beam 8 at the other end (that is, left) is increased by 0.05 degrees.

As shown in the fifth row of the table in FIG. 7, when the reflected light of the optical beam 8 at the position of +28 degrees and the optical beam 8 at the position of −28 degrees among the four optical beams 8 is detected, it is determined that both the right side and the left side are of optimum sizes. In this case, the distance measurement scanning angle D is not subjected to correction control.

As shown on the sixth row of the table in FIG. 7, when the reflected light of the one optical beam 8 is detected at the position of +28 degrees, a second optical beam 8 detected at the position of (+28−0.07) degrees, and a third optical beam 8 detected at the position of −28 degrees among the four optical beams 8 which are detected, it is determined that the right side is oversized and the left side is an optimum size. In this case, the distance measurement scanning angle D is decreased in amplitude by 0.05 degrees and is shifted to the left by 0.05 degrees. Specifically, the position A11 (+27.5 degrees) of the optical beam 8 at the one end (that is, right) of the distance measurement scanning angle D is decreased by 0.075 degrees, and the position A21 (−27.5 degrees) of the optical beam 8 at the other end (that is, left) is decreased by 0.25 degrees.

As shown in the seventh row of the table in FIG. 7, when the reflected light of the optical beam 8 is detected at the position of −28 degrees and the optical beam 8 is detected at the position of (−28+0.07) degrees, among the four optical beams 8 which are detected, it is determined that the right side is undersized and the left side is oversized. In this case, the distance measurement scanning angle D is shifted to the right by 0.05 degrees. Specifically, the position A11 (+27.5 degrees) of the optical beam 8 at the one end (that is, right) of the distance measurement scanning angle D is increased by 0.05 degrees, and the position A21 (−27.5 degrees) of the optical beam 8 at the other end (that is, left) is increased by 0.05 degrees.

As shown in the eighth row of the table in FIG. 7, when the reflected light of the optical beam 8 is detected at the position of −28 degrees, the optical beam 8 is detected at the position of (−28+0.07) degrees, and the optical beam 8 is detected at the position of +28 degrees, among the four optical beams 8 which are detected, it is determined that the right side an optimum size and the left side is oversized. In this case, the distance measurement scanning angle D is decreased in amplitude by 0.05 degrees and is also shifted to the right by 0.05 degrees. Specifically, the position A11 (+27.5 degrees) of the optical beam 8 at the one end (that is, right) of the distance measurement scanning angle D is increased by 0.025 degrees, and the position A21 (−27.5 degrees) of the optical beam 8 at the other end (that is, left) is increased by 0.75 degrees.

As shown in the ninth row of the table in FIG. 7, when the reflected light of all four optical beams 8 is detected, it is determined that both the right side and the left side are oversized. In this case, the distance measurement scanning angle D is decreased in amplitude by 0.1 degree. Specifically, the position A11 (+27.5 degrees) of the optical beam 8 at the one end (that is, right) of the distance measurement scanning angle D is decreased by 0.05 degrees, and the position A21 (−27.5 degrees) of the optical beam 8 at the other end (that is, the left end) is increased by 0.05 degrees.

In the second embodiment, a program for the correction control of a scanning angle is created and executed by the control unit 9 to perform each control operation described in the table of FIG. 7.

When the correction control of a scanning angle described in the table of FIG. 7 is executed, the correction control of the scanning angle D is converged to a state which is shown on the fifth row of the table. That is, the scanning angle D is converged to a state in which the right side and the left side in optimum states. Accordingly, the scanning angle D can be fixed to a precise degree, which makes it possible to improve the stability of the control, compared to the first embodiment.

The components of the second embodiment other than the ones described above are the same as those of the first embodiment. Therefore, the second embodiment makes it possible to obtain almost the same advantageous effects as those of the first embodiment.

Third Embodiment

Figure 8:
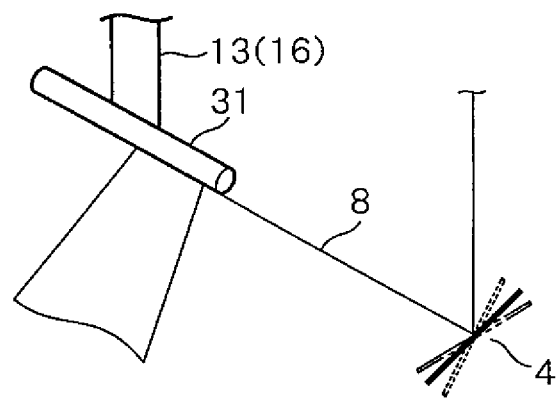
FIG. 8 is a partial perspective view of a reflector and its vicinity in a third embodiment.

FIG. 8 illustrates a third embodiment. Components of the third embodiment which are the same as those of the first embodiment are given the same reference signs. In the third embodiment, a cylindrical reflector 31 is used as an alternative for the reflectors 14 and 17 of the leading end portions of the first screw 13 and the second screw 16, for example. In this configuration, as illustrated in FIG. 8, the optical beam 8 is reflected by a linear portion on the outer peripheral surface of the cylindrical reflector 31, and the reflected light is incident to the optical detector 19.

The components of the third embodiment other than the ones described above are the same as those of the first embodiment. Therefore, the third embodiment makes it possible to obtain almost the same advantageous effects as those of the first embodiment.

Fourth Embodiment

Figure 9:
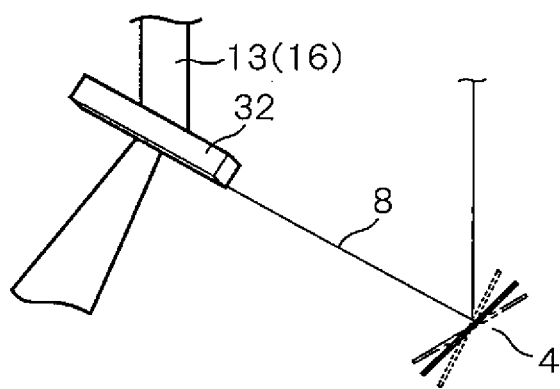
FIG. 9 is a partial perspective view of a reflector and a vicinity thereof, according to a fourth embodiment.

FIG. 9 illustrates a fourth embodiment. Components of the fourth embodiment which are the same as those of the third embodiment are given the same reference signs. In the fourth embodiment, a square prism-shaped reflector 32 is used as an alternative for the cylindrical reflector 31, for example. In this configuration, as illustrated in FIG. 9, the optical beam 8 is regularly reflected by one plane of the square prism-shaped reflector 32, and the reflected light incident to the optical detector 19.

The components of the fourth embodiment other than the ones described above are the same as those of the third embodiment. Therefore, the fourth embodiment makes it possible to obtain almost the same advantageous effects as those of the third embodiment. In particular, in the fourth embodiment, the optical beam 8 is regularly reflected by one plane of the square prism-shaped reflector 32, and the reflected light is detected by the optical detector 19. This makes it possible to increase the amount of reflected light detected by the optical detector 19.

In addition, in the fourth embodiment, the square prism-shaped reflector 32 is used but the present invention is not limited to this. Alternatively, a triangular prism-shaped, or pentagonal or other polygonal prism-shaped reflector, or a reflector of any other shape with one flat reflection plane (for example, a blade of a razor or the like) may also be used.

In the foregoing embodiments, the two reflectors 14 and 17 are provided. However, only either one of the two reflectors 14 and 17 may be alternatively provided. It is preferable to execute almost the same correction control of the scanning angle D as the correction control of the scanning angle D in the foregoing embodiments on the side provided with the reflector, that is, the side where the end of the scanning angle D is detected, and the correction control bilaterally symmetrical to the correction control on the detection side is executed on the side without the reflector, that is, the side where no end of the scanning angle D is detected.

In the foregoing embodiments, the two reflectors 14 and 17 are configured to be adjustable in position. Alternatively, the two reflectors 14 and 17 may be fixed to the case 2. In this case, the two reflectors 14 and 17 may be configured such that the positions of the two fixed reflectors 14 and 17, that is, the positions of the optical beams hitting the two fixed reflectors 14 and 17 are measured by an optical angle measurement device, for example, and the measured angles (that is, the measurement results) are provided to the control unit 9, and then the control unit 9 performs angle calculation based on the measured angles to determine the positions A11 and A21 of the left and right ends of the distance measurement scanning angle D, whereby the scanning angle D is corrected (that is, adjusted). Only either one of the two reflectors 14 and 17 may be fixed to the case 2. In this configuration, the scanning angle D can be corrected in almost the same manner as in the foregoing modification examples.

The present disclosure has been described according to examples, but it is noted that the present disclosure is not limited to the foregoing examples or structures. The present disclosure includes various modifications and changes in a range of equivalency. In addition, various combinations and modes, and other combinations and modes including only one element of the foregoing combinations and modes, less or more than the one element fall within the scope and conceptual range of the present disclosure.

What is claimed is:

1. An optical scanning device provided in a pulse distance measurement radar apparatus, comprising:
    a reflector that is arranged outside and adjacent to a scanning angle of an optical beam at a minimal angle in an angular width of direction of the scanning angle, the scanning angle being larger than an adjusting angle provided to adjust an amplitude of the optical beam;
    an optical detector that is arranged at a position in which reflected light from the reflector reaches;
    a scanning angle detector configured to detect the scanning angle of the optical beam based on a detection result of the optical detector; and
    an adjustment mechanism configured to adjust a position of the reflector,
    wherein
    the reflector comprises reflectors in which a reflector is positioned on each respective outer side of the scanning angle of the optical beam in an angular width direction of the scanning angle, and
    the optical detector is configured to detect the reflected light from the reflectors on both outer sides of the scanning angle of the optical beam.

2. The optical scanning device according to claim 1, wherein
    the position of the reflector is fixed and calculation of an angle is performed based on a result of a measured position of the reflector to adjust the scanning angle of the optical beam.

3. The optical scanning device according to claim 1, wherein
    a first detection optical beam is generated outside of one end of the scanning angle of the optical beam; and
    a second detection optical beam is generated inside of the first detection optical beam, wherein
    the first detection optical beam is reflected by the reflector and the second detection optical beam is not reflected by the reflector.

4. The optical scanning device according to claim 3, wherein
    the first detection optical beam and the second detection optical beam are generated on each of the respective outer sides of the scanning angle of the optical beam.

5. The optical scanning device according to claim 1, comprising:
    a shield mechanism that permits incidence of the reflected light from the reflector into the optical detector, and blocks the incidence of the reflected light from another object into the optical detector.

6. The optical scanning device according to claim 5, wherein
    the shield mechanism is disposed to block a light path linearly connecting a cover glass and the optical detector to shield the optical detector from at least scattered light from the cover glass.

7. An optical scanning device provided in a pulse distance measurement radar apparatus, the optical scanning device including a light source and an optical scanning unit, the light source configured to emit an optical beam, the optical scanning unit configured to reflect the optical beam emitted from the light source within a range defined as a scanning angle of the optical beam, the optical scanning device comprising:
    a reflector configured to adjust the scanning angle by reflecting a portion of the optical beam at an outer extent of the optical beam, the reflector being movable to narrow or widen the scanning angle;
    an optical detector located at a position to receive reflected light that is reflected from the reflector; and
    a scanning angle detector configured to detect the scanning angle of the optical beam based on a detection result of the optical detector.

8. The optical scanning device according to claim 7, wherein
    the position of the reflector is fixed and calculation of an angle is performed based on a result of a measured position of the reflector to adjust the scanning angle of the optical beam.

9. The optical scanning device according to claim 7, comprising:
    a shield mechanism configured to permit incidence of the reflected light from the reflector into the optical detector, and block the incidence of the reflected light from another object into the optical detector.

10. The optical scanning device according to claim 2, comprising:
    a shield mechanism configured to permit incidence of the reflected light from the reflector into the optical detector, and block the incidence of the reflected light from another object into the optical detector.

11. The optical scanning device according to claim 3, comprising:
    a shield mechanism configured to permit incidence of the reflected light from the reflector into the optical detector, and block the incidence of the reflected light from another object into the optical detector.

12. The optical scanning device according to claim 4, comprising:
    a shield mechanism configured to permit incidence of the reflected light from the reflector into the optical detector, and block the incidence of the reflected light from another object into the optical detector.

13. The optical scanning device according to claim 7, comprising:
    an adjustment mechanism configured to adjust the position of the reflector.

* * * * *